United States Patent [19]

Taylor, Jr. et al.

[11] 4,155,088
[45] May 15, 1979

[54] DUAL FREQUENCY TRANSMISSION APPARATUS FOR FREQUENCY-AGILE RADAR SYSTEMS UTILIZING MTI TECHNIQUES

[75] Inventors: John W. Taylor, Jr.; Albert L. Sinclair, both of Baltimore, Md.

[73] Assignee: Westinghouse Electric Corp., Pittsburgh, Pa.

[21] Appl. No.: 617,151

[22] Filed: Feb. 20, 1967

[51] Int. Cl.² ............................ G01S 9/42; G01S 9/23
[52] U.S. Cl. .................... 343/7.7; 343/17.2 R; 343/18 E
[58] Field of Search ............... 343/7.7, 17.2, 17.2 R, 343/18 E

[56] References Cited

U.S. PATENT DOCUMENTS

| 3,015,819 | 1/1962 | Thonrel | 343/7.7 |
| 3,165,738 | 1/1965 | Eastwood et al. | 343/7.7 |

*Primary Examiner*—Maynard R. Wilbur
*Assistant Examiner*—Lawrence Goodwin

[57] ABSTRACT

This invention discloses pulse radar apparatus for the transmission of radar pulses having a pair of frequencies in each rf pulse. One of the frequencies transmitted in each pulse is repeated in the succeeding pulse while the other frequency is changed to a new frequency. Moreover, the repeated frequency appears in the same relative position in the pulse pair as in its original occurrence.

11 Claims, 3 Drawing Figures

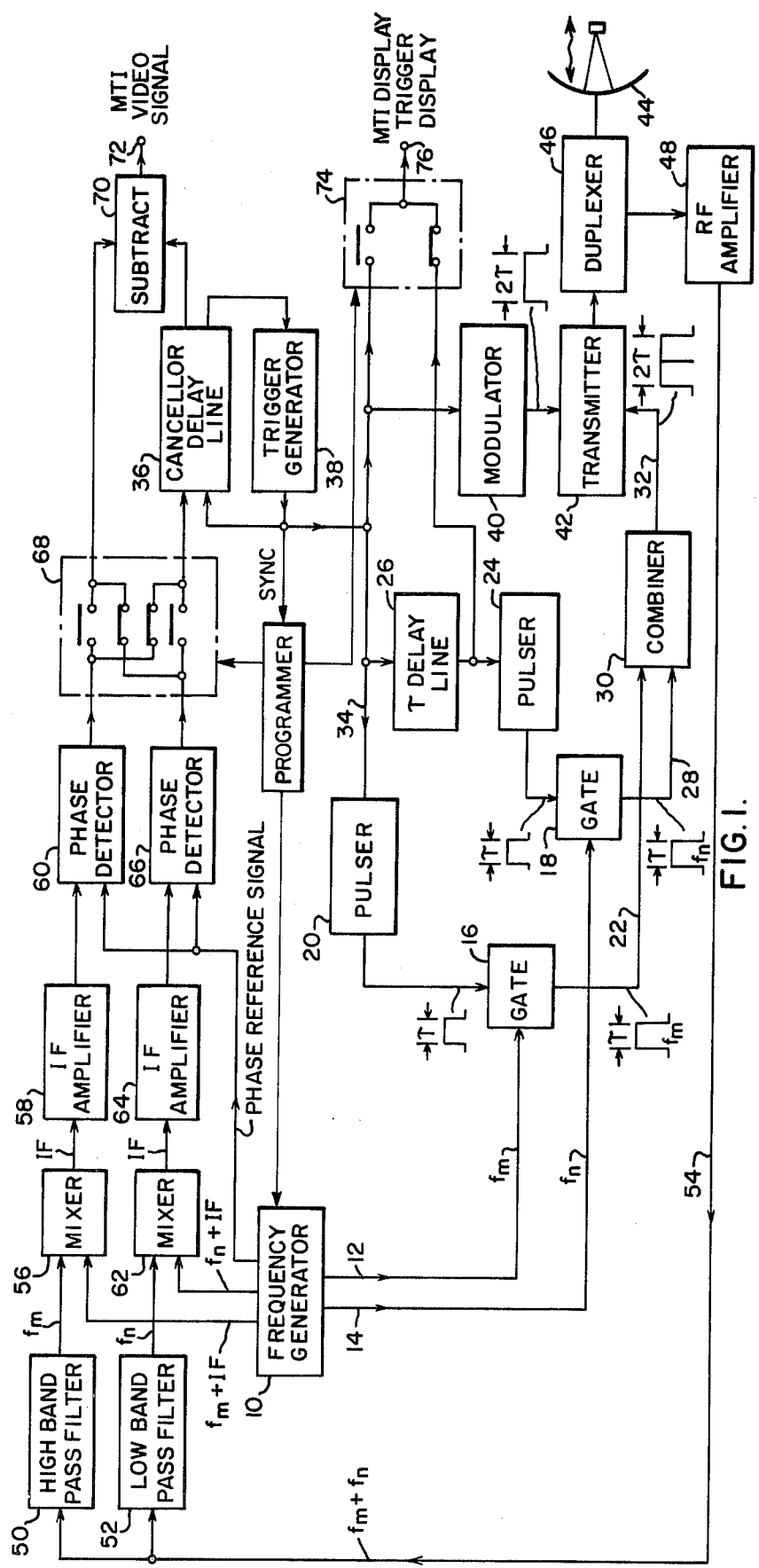
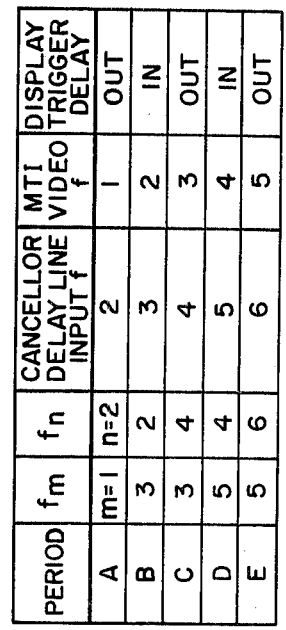
FIG.3.
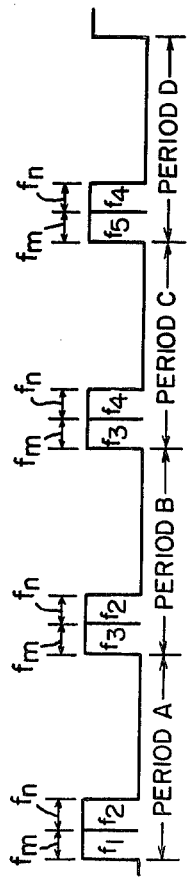
INVENTORS
John W. Taylor, Jr. &
Albert L. Sinclair.
BY Ernest P. Klipfel
ATTORNEY

DUAL FREQUENCY TRANSMISSION APPARATUS FOR FREQUENCY-AGILE RADAR SYSTEMS UTILIZING MTI TECHNIQUES

BACKGROUND OF THE INVENTION

Radar systems are often confronted with the problem of detecting moving targets in the presence of more-or-less stationary clutter. This problem is attacked from two fronts. One solution to this problem is to utilize the narrowest possible antenna beam and the widest bandwidth to minimize the radar cell size, i.e., the physical volume from which clutter echoes are being received at any instant of time. The other solution is to employ methods of comparing the phase of successive echoes to suppress stationary echoes which is commonly referred to as the MTI (moving target indicator) technique. MTI, however, is hampered by restrictions on a number of radar parameters. The use of a uniform pulse repetition frequency (prf) creates blind velocities at which the target moves an integer number of half wavelengths between pulses. To counter this particular problem, some systems have a staggered prf, but it greatly adds to the complexity of the system. The prf is rarely as high as would be desirable from the standpoint of velocity discrimination. It is limited by the range ambiguities it creates. As a result, the number of pulses received during the time that the beam of a search radar scans past the target is limited. Systems which must make a target detection based on very few samples of data are inherently vulnerable to intermittent interference from other radars or from jammers; therefore, hits per beamwidth is an important parameter which restricts the degree to which the beam can be narrowed.

A characteristic desired by most modern radars is frequency agility which is the ability to switch between a number of transmission frequencies as the beam passes over the target. This is desirable to reduce the probability of prolonged interference from other radars, narrow banded jammers, etc. Examples of such radars are shown and described in the following patents: U.S. Pat. No. 3,229,284, issued to W. L. Rubin; U.S. Pat. No. 3,263,227 issued to J. W. Ferry et al; and U.S. Pat. No. 3,267,467, issued to L. Gerardin et al. The Rubin patent describes a radar adapted for the transmission of a linear frequency modulated pulsed carrier signal. The Ferry et al patent describes a radar system where the transmitted pulse is made up of a number of pulse segments each of equal duration but of different frequency, transmitted sequentially and where the received return pulse signals are added to form a composite pulse whose width is that of the duration of one of the transmitted pulse signals. The Gerardin et al patent describes a radar wherein the transmitted pulse is sub-divided into a certain number of constitution pulses each of which have a different frequency varying according to a predetermined order; however, the order is the inverse of that in which they are emitted in the previous composite pulse.

Frequency agility is also extremely beneficial in the clutter environment. Frequency agility causes pulse-to-pulse scintillation of a strength of the echo from both target and clutter rather that the usual scan-to-scan variation. False alarms created by clutter are reduced, because the average of the echoes received during one beamwidth motion of the antenna does not fluctuate so wildly. Detection of targets is also improved when one is concerned with high detection probabilities because abnormally low target cross-sections at certain frequencies are averaged with higher values at other frequencies.

Most of the improvement in target detectability is achieved by the time the number of frequencies per beamwidth reaches ten but false alarm improvement continues indefinitely. It is desirable, therefore, to radiate a minimum of ten frequencies as the radar scans pass the target. In a clutter environment the ability to detect targets is determined solely by the number of frequencies one is able to sample in one beam width and not the amount of energy radiated.

SUMMARY OF THE INVENTION

The present invention discloses apparatus for combining the concepts of frequency agility and MTI while avoiding the sacrifice of performance which this combination heretofore necessitates. MTI requires a minimum of two pulses of the same frequency to be radiated in successive pulses. It is generally implemented with a delay line to store the past or preceding echo data which delay line must have a delay period which matches the interpulse period exactly. Frequency agility, on the other hand, requires the change of frequency on a pulse-to-pulse basis. The subject invention comprises means for transmitting a pair of frequencies in each pulse with subsequent pulses repeating one of the preceding frequencies while replacing the other frequency with yet a new frequency. The repeated frequency always appears in the same pulse segment as it appeared in its original occurrence. The invention includes means for filtering each received pulse to obtain the two frequencies transmitted and means are also included for comparing the repeated frequency with the frequency previously transmitted for the purposes of obtaining an MTI video signal. MTI is thus obtained without the deletion of any pulses whereas it was heretofore required to throw away every other pulse. By the means of the present invention, an additional advantage is gained in that more frequencies are fed to the target over a beamwidth which inherently increases the probability of detection.

BRIEF DESCRIPTION OF THE DRAWINGS

FIG. 1 is a block diagram of the preferred embodiment of the present invention;

FIG. 2 is a representation of the rf pulses transmitted in accordance with the invention; and FIG. 3 is a tabulation helpful in understanding the operation of the subject invention.

DESCRIPTION OF THE PREFERRED EMBODIMENT

Referring now to FIG. 1, a frequency generator 10 is shown providng a plurality of output signals having frequencies of $f_m$, $f_n$, $f_m+IF$, $f_n+IF$ and a phase reference signal. The frequencies $f_m$ and $f_n$ are selected so that they are respectively widely separated in order to eliminate component frequencies from interfering with each other in the receiver. Each of the signals $f_m$ and $f_n$ are selectively switched to as many as ten different frequencies over a plurality of radar pulses. The selected frequencies for $f_m$ and $f_n$ appear on output leads 12 and 14, respectively, and are adapted to repeat in frequency for two successive pulse periods. For example, referring to the tabulation shown in FIG. 3, during the first period A, $f_m$ has a frequency of $f_1$ while frequency $f_n$ has a frequency of $f_2$. In the second or period B, the frequency of $f_m$ changes to frequency $f_3$ while the frequency $f_n$ remains equal to $f_2$. Going one period further, i.e., period C, the frequency of $f_m$ remains at $f_3$ while $f_n$ changes to frequency $f_4$.

The frequency signal on circuit lead 12 corresponding to $f_m$ is fed into a first gate circuit 16 while the signal corresponding to frequency $f_n$ is fed into a second gate circuit 18. The gate circuit 16 is coupled to and controlled by a pulser circuit 20 which provides a gating signal having a pulse width of $\tau$. The output of the gate circuit 16 appears on circuit lead 22 and is a signal pulse having a frequency of $f_m$ and a pulse width of $\tau$. The second gate circuit 18 is coupled to and controlled by a second pulser circuit 24 which also provides a gating signal in the form of a pulse having a pulse width of $\tau$; however, the pulser is triggered from a delay line 26 which also has a delay of $\tau$. The gate circuit 18 then provides an output signal on circuit lead 28 of a signal pulse having a frequency of $f_n$ with a pulse width of $\tau$. The pulse signal which appears to circuit lead 28, however, is delayed with respect to the pulse signal which appears to circuit lead 22 by a time equal to $\tau$. Applying both of these signals to the input of a combiner circuit 30 produces an output signal at circuit lead 32 which is a composite pulse having a pulse width of $2\tau$ and is comprised of two contiguous pulses of pulse width $\tau$ and having a frequency of $f_m$ and $f_n$, respectively.

The signal pulses thus formed in gate circuits 16 and 18 are synchronized by means of a recirculating trigger which appears on circuit lead 34. This trigger is generated by a time delay line cancellor comprising cancellor delay line 36 and trigger generator 38 and including means for coupling the outputs and inputs of these circuits to each other. A delay line cancellor circuit provides regularly recurring triggers with a frequency which is determined precisely by the period of the delay line. This circuit is well known to those skilled in the art and is described, for example, in "Introduction to Radar Systems", Merrill Skolnik, McGraw Hill, 1962.

The recirculating trigger appearing on circuit lead 34 is also applied to the radar modulator 40. The purpose of the modulator is to control the transmitter section 42 of the radar which may be, for example, a traveling wave tube, klystron or other type of high powered rf transmission apparatus utilized for coherent systems. The recirculating trigger appearing on circuit lead 34 is simultaneously applied to the pulser 20, the delay line 26, and modulator 40. The modulator 40 is responsive to each trigger and generates a modulator pulse having a pulse width which is equal to but preferably slightly greater than twice the period $2\tau$. When the modulator pulse is applied to the transmitter 42, it is turned on and a radar rf pulse comprising the composite pulse of frequencies $f_m$ and $f_n$ is fed to the antenna by means of the duplexer circuit 46 and transmitted therefrom.

What has been shown and decribed thus far is a means for generating a train of radar pulses in which each pulse is comprised of a pair of frequencies where each successive rf pulse contains one of the frequencies which had been transmitted during the previous pulse. Moreover, the frequency repeated maintains its same relative position in both pulses. If the modulator pulse were perfectly flat as in a perfect square wave, it would not be necessary to repeat the frequency in the same relative position of the two pulses. However, because a droop actually does exist in the modulator pulse, it is necessary to have the frequencies repeated in their same relative positions on successive pulses; otherwise, phase changes will occur in the transmitter 42.

FIG. 2, moreover, illustrates the inventive concept contemplated by the subject invention. Shown is a series of rf pulses transmitted during pulse periods A, B, C and D. The rf pulse transmitted during period A is comprised of frequencies $f_1$ and $f_2$ corresponding to frequencies $f_m$ and $f_n$, respectively. In the pulse period B, frequencies $f_3$ and $f_2$ are transmitted. It can be seen that $f_1$ has been eliminated and $f_3$ substituted in its place. $f_2$, however, is common to both pulses and appears in the same position. Proceeding to period C, the rf pulse now comprises frequencies $f_3$ and $f_4$ with frequency $f_3$ being retained in its position shown with respect to period B but now frequency $f_4$ has been substituted for $f_2$. It can be seen then that on successive pulses, one frequency is changed while one remains with the remaining frequency being in the same position as its first occurrence.

Continuing further, reference to FIG. 1 discloses an rf amplifier 48 coupled to the duplexer 46. When the rf pulses described above are transmitted and subsequently received at the antenna 44, the received pulses comprising frequencies $f_m$ and $f_n$ are fed to the rf amplifier 48 by means of the duplexer. The output of the rf amplifier 48 is then simultaneously fed to a high band pass filter 50 and a low band pass filter 52 by means of the circuit lead 54. The output of the high band pass filter 50 is fed to a first mixer circuit 56 which has another input applied thereto from the frequency generator 10 in the form of a signal comprising frequency $f_m + IF$. The IF output signal from the mixer 56 is amplified in the IF amplifier 58 and applied to a coherent phase detector circuit 60. The detector circuit 60 also receives a phase reference signal from the frequency generator 10. The phase reference signal is often referred to as the "coho" signal in an MTI system.

Likewise, with respect to the low band pass filter 52, a second mixer 62 is fed a signal of frequency $f_n$. A signal comprising frequency $f_n + IF$ is applied from the frequency generator 10 providing an IF output signal to the IF amplifier 64. This IF is then fed to a second coherent phase detector 66 which simultaneously receives the phase reference signal applied to phase detector 60.

An electronic switch 68 is coupled to the outputs of phase detectors 60 and 66, respectively, and is operable to 60 and 66 during each period so that the IF signal from phase detector 60 is applied to the cancellor delay line 36 during one period while the IF signal from phase detector 66 is applied to the cancellor delay line 36 in the following period. One output of the electronic switch 68 is fed to the cancellor delay line 36 while the output thereof is directly connected to a subtractor or comparative circuit 70. The subtractor circuit also receives a second input from the cancellor delay line 36. The purpose of the subtractor unit is to generate the MTI video signal by comparing the repeated frequency signals on successive radar pulses.

In order to more fully explain the manner in which the MTI video signal is produced, reference should be made to FIG. 3. At the beginning of period B, the frequency $f_m$ is $f_3$ while the frequency $f_n$ is $f_2$. During period B, the IF frequency input to the cancellor delay line 36 would be frequency $f_3$ which will be used as the MTI frequency for period C. During period B, however, frequency $f_2$ has been put into the cancellor frequency delay line 36 during period A and is just leaving the delay line 36 at a time that it is simultaneously applied to the subtractor circuit 70. In other words, during period B, frequehncy $f_2$ goes undelayed into the subtractor circuit for comparison while it is also being fed from the cancellor delay line having been placed there during the previous period which is period A. The MTI video frequency for period B, then, is the frequency $f_2$. In period C, the MTI video frequency would be frequency $f_3$ and during period D, the MTI video frequency would be frequency $f_4$ and so on. In each period, then, the MTI video frequency utilized is that frequency which has been placed into the cancellor delay line 36 during the previous period. Thus, it is possible to obtain MTI video information during each period of the rf pulse transmission due to the fact that successive pulses always contain one frequency which is the same. Also because the modulator pulse has a certain droop inherently associated with it, the frequency coincidence between successive pulses always occurs in the same relative position within the pulse. As already noted, the droop would cause phase changes in the transmitter. If there were no droop in the modulator pulse, it would not be necessary that the frequency repetition should occur in the same position of the other pulse. It would only be necessary that the same frequency should occur in each successive pulse, i.e., one frequency remaining while the other frequency is changed.

Due to the fact that in the subject invention the repeated frequency always appears in the same position within the rf pulse, it is necessary to synchronize the MTI display trigger signal accordingly. To this end, a second electronic switch 74 is coupled both to the trigger generator 38 by means of circuit lead 34 and the output of the delay line 26. The electronic switch 74 operates to delay the trigger on alternate periods by the time $\tau$ which it should be noted is the pulse width of each frequency pulse component applied to the combiner circuit 30. A study of FIGS. 2 and 3 illustrate this requirement. For example, in Period A the MTI video frequency f is $f_1$. Observing the rf pulse transmitted for Period A, as shown in FIG. 2, frequency $f_1$ appears in the first half portion of the rf pulse transmitted. In this instance, there is no need for the display trigger for the MTI video to be delayed; however, in Period B, the MTI video frequency is $f_2$. Noting the rf pulse for the Period B, the frequency $f_2$ occurs in the second half portion of the rf pulse. It is therefore necessary in Period B to delay the display trigger for a time equal to $\frac{1}{2}$ of the rf pulse length which in actuality is the Period $\tau$.

What has been shown and described therefore is a system for the dual frequency transmission of radar rf pulses for providing frequency agile MTI. Two frequencies are transmitted in each pulse, one being a frequency employed in the preceding pulse, and the other in a new selection. It should also be pointed out that when desirable the two halves of the rf pulse can be equalized in time delay and added non-coherently to retain the full use of the transmitted energy. This might be desirable for long range search operation where noise rather than clutter is the dominant problem and MTI is not utilized. Utilizing two or more frequencies per pulse benefits normal operation as well as MTI performance since more samples of the target cross-section are provided which reduces the likelihood of the average cross-section being abnormally low.

While there has been shown and described what is at present considered to be the preferred embodiment of the invention, modifications will readily occur to those skilled in the art. For example, the concept can be applied to a three pulse cancellor, utilizing a transmitter pulse broken into three component frequencies. One of the three frequencies would be changed for each transmission, as in the two pulse system. Likewise, only one of the three frequencies would have data available from the last two transmission periods to form an MTI comparison.

Similarly, digital MTI techniques can be substituted for the analog processes shown in FIG. 1. The phase detector outputs can be sampled at intervals less than $\tau$ apart and converted into digital numbers. These are then stored in cores or other digital storage devices rather than delay lines. The MTI subtractor and trigger generation would also be handled by digital processing means in such an implementation. It is not desired therefore that the invention be limited to the specific arrangement shown and described but it is to be understood that all equivalents, alterations, modifications within the spirit and scope of the invention are herein meant to be included.

What is claimed is:

1. In a pulse radar system for providing frequency agile MTI, the combination comprising:
    frequency generator means including a plurality of output terminals and providing a different frequency of a plurality of predetermined frequencies at each of said plurality of output terminals in a selected order which varies the frequency combination from time interval to time interval with at least one frequency being present for at least two sequential time intervals;
    trigger generator means;
    circuit means coupled to said plurality of output terminals and said trigger generator means for providing a plurality of pulses of predetermined pulse width and each having a carrier of the selected frequency of said plurality of predetermined frequencies from said frequency generator means;
    combiner circuit means coupled to said circuit means for combining all of said plurality of pulses into a composite pulse, said composite pulse comprising all of the selected frequencies of said plurality of predetermined frequencies during one time interval;
    transmitter means coupled to said combiner circuit means including means for being rendered operative for a period at least equal to the pulse width of said composite pulse;
    and antenna means coupled to said transmitter means for radiating said composite pulse outwardly therefrom.

2. Apparatus as defined in claim 1 and additionally including switch means coupled to said circuit means coupled to said plurality of output terminals and said trigger generator means for selectively providing either a delayed or undelayed trigger signal for MTI display apparatus.

3. In a pulse radar system including a frequency agile MTI capability the combination comprising:
    frequency generator means providing first and second output signals having a frequency of $f_m$ and $f_n$, respectively, including means for maintaining each frequency for two successive time intervals but changing the frequency of $f_m$ and $f_n$ alternately on sequential time intervals to different selected frequencies;
    trigger generator means for providing a pulse train of timing triggers for said system;

gate circuit means coupled to said frequency generator means and said trigger generator means, being responsive to said first and said second output signals and providing a first and a second pulse signal in accordance with a time reference established by said timing triggers, said first pulse signal comprising said frequency $f_m$ and having a pulse width $\tau$, said second pulse signal comprising said frequency $f_n$ and having a pulse width $\tau$ and a time delay relative to said first pulse signal at least equal to $\tau$;

combiner circuit means coupled to said gate circuit means, being responsive to said first and said second pulse signal to produce a composite pulse signal having a pulse width of at least $2\tau$ wherein one-half of said composite pulse signal comprises frequency $f_m$ and the other half of said composite pulse signal comprises frequency $f_n$; and rf pulse transmission means coupled to said combiner circuit and said trigger generator means for transmitting said composite pulse signal in accordance with said time reference of said timing triggers;

and antenna means coupled to said rf pulse transmission means for directing said composite pulse signal to an external target.

4. Apparatus as defined in claim 3 and additionally including switch means coupled to said trigger generator means and said gate circuit means for providing delayed and undelayed triggers in alternate sequential time intervals for MTI display apparatus, said delayed triggers having a time delay $\tau$.

5. The radar system as defined by claim 3 wherein said trigger generator means comprises a recirculating trigger delay line cancellor circuit comprising:
a trigger generator;
a cancellor delay line including means for coupling the output of said cancellor delay line to the input of said trigger generator,
and means for coupling the output of said trigger generator to the input of said cancellor delay line.

6. The radar system as defined by claim 3 wherein said gate circuit means comprises:
a first pulse generator circuit coupled to said trigger generator means being responsive to said timing triggers to provide a first pulse waveform having a pulse width $\tau$;
a first gate circuit coupled to said first pulse generator circuit and said frequency generator means, said first gate circuit being responsive to said first pulse waveform to provide said first pulse signal thereby;
a time delay means having a time delay $\tau$ coupled to said trigger generator means;
a second pulse generator circuit coupled to said time delay means providing a second pulse waveform having a pulse width of $\tau$ delayed with respect to said first pulse waveform by a time delay $\tau$;
and a second gate circuit coupled to said second pulse generator means for providing said second pulse signal.

7. The pulse radar system as defined by claim 3 wherein said rf pulse transmission means comprises:
coherent pulse transmission apparatus,
and an rf modulator circuit means coupled to said trigger generator means providing a modulator pulse having a pulse width of at least $2\tau$ including means for applying said modulator pulse to said coherent transmission apparatus for rendering said apparatus operative in accordance with said modulator pulse.

8. Apparatus as defined in claim 3 additionally including MTI receiver apparatus coupled to said antenna means, being responsive to composite pulse signals transmitted and received therefrom to produce an MTI video signal from the frequencies $f_m$ and $f_n$ when either frequency is selectively repeated in successive time intervals.

9. The apparatus as defined in claim 8 wherein said receiver apparatus comprises:
filter means responsive to the frequencies of $f_m$ and $f_n$ of rf pulses received by said antenna means;
mixer means coupled to said filter means and said frequency generator for providing a first and a second IF signal in response to said frequencies $f_m$ and $f_n$;
electronic switch means coupled to said mixer means and having a pair of output terminals, being responsive to said first and said second IF signals for alternately coupling said first and second IF signals to said pair of output terminals;
delay line means coupled to one of said pair of output terminals;
a comparator circuit coupled to the other of said pair of output switch terminals;
and means coupling said delay line means to said comparator circuit for providing an MTI video signal thereby.

10. The apparatus as defined in claim 9 wherein said filter means comprises:
a relatively high frequency bandpass filter and a relatively low frequency bandpass filter, said high bandpass filter providing an output signal having a frequency of $f_m$ and said low bandpass filter having an output of frequency of $f_n$.

11. Apparatus as defined in claim 1 including means for realigning the pulse echoes from each of the frequencies of a radiated composite pulse to be superimposed on a display.

* * * * *